US011032206B2

(12) United States Patent
Mula et al.

(10) Patent No.: US 11,032,206 B2
(45) Date of Patent: Jun. 8, 2021

(54) PACKET-CONTENT BASED WRED PROTECTION

(71) Applicant: Mellanox Technologies TLV Ltd., Raanana (IL)

(72) Inventors: Liron Mula, Ramat Gan (IL); Sagi Kuks, Ramat Gan (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 26 days.

(21) Appl. No.: 16/181,413

(22) Filed: Nov. 6, 2018

(65) Prior Publication Data

US 2020/0145340 A1 May 7, 2020

(51) Int. Cl.
*H04L 12/833* (2013.01)
*H04L 12/935* (2013.01)
*H04L 12/823* (2013.01)
*H04L 12/801* (2013.01)

(52) U.S. Cl.
CPC .............. *H04L 47/31* (2013.01); *H04L 47/12* (2013.01); *H04L 47/326* (2013.01); *H04L 49/3018* (2013.01)

(58) Field of Classification Search
CPC ..... H04L 47/10; H04L 12/5695; H04L 47/15; H04L 47/2441; H04Q 11/0478
USPC ....................................................... 370/230
See application file for complete search history.

(56) References Cited

U.S. PATENT DOCUMENTS

| 6,381,638 B1* | 4/2002 | Mahler | H04L 29/12009 370/355 |
| 6,674,718 B1* | 1/2004 | Heddes | H04L 47/10 370/230 |
| 6,950,393 B1* | 9/2005 | Ben Nun | H04L 49/90 370/229 |
| 7,349,336 B2* | 3/2008 | Mathews | H04L 47/10 370/230 |
| 7,440,405 B2* | 10/2008 | Hsieh | H04L 12/4633 370/230 |
| 7,554,907 B1* | 6/2009 | Epps | H04L 47/10 370/230 |
| 7,990,868 B1* | 8/2011 | Gallagher | H04L 45/60 370/235 |

(Continued)

OTHER PUBLICATIONS

Cisco IOS Quality of Service Solutions Configuration Guide, Release 12.2, Updated: Jan. 30, 2014, Chapter: Congestion Avoidance Overview.*

(Continued)

*Primary Examiner* — Peter G Solinsky
*Assistant Examiner* — Sanjay K Dewan
(74) *Attorney, Agent, or Firm* — Kligler & Associates Patent Attorneys Ltd

(57) ABSTRACT

A network element includes multiple ports and logic. The multiple ports are configured to serve as ingress ports and egress ports for receiving and transmitting packets from and to a network. The logic is configured to queue the packets received from the ingress ports, run a packet-dropping process that randomly drops one or more of the queued packets to avoid congestion, while detecting and excluding from the packet-dropping process, at least probabilistically, packets belonging to a predefined packet type, and forward the queued packets, which were not dropped, to the egress ports.

15 Claims, 2 Drawing Sheets

(56) References Cited

U.S. PATENT DOCUMENTS

| | | | | |
|---|---|---|---|---|
| 8,274,974 B1* | 9/2012 | Gupta | ............... | H04L 47/30 370/389 |
| 10,084,716 B2* | 9/2018 | Gafni | ............... | H04L 47/32 |
| 2003/0103458 A1* | 6/2003 | Shin | ............... | H04L 47/10 370/230 |
| 2005/0125195 A1* | 6/2005 | Brendel | ............... | H04L 43/00 702/182 |
| 2008/0022000 A1* | 1/2008 | Furuya | ............... | H04L 12/2854 709/228 |
| 2017/0337010 A1* | 11/2017 | Kriss | ............... | G06F 3/061 |

OTHER PUBLICATIONS

Cisco Systems Inc, "IOS Quality of Service Solutions Configuration Guide", Release 12.2, Part 3, pp. 1-28, Jan. 30, 2014.
Hoeiland-Joergensen et al., "The Flow Queue CoDel Packet Scheduler and Active Queue Management Algorithm", Request for Comments: 8290, pp. 1-25, Jan. 2018.
Schepper et al., DualQ Coupled AQM, pp. 1-45, Jul. 2015.

* cited by examiner

PACKET-CONTENT BASED WRED PROTECTION

FIELD OF THE INVENTION

The present invention relates generally to packet communication networks, and particularly to methods and systems for congestion control in such networks.

BACKGROUND OF THE INVENTION

Congestion management of packet traffic in communication systems is important as poor congestion control may significantly impact system performance.

A Random Early Detection (RED) algorithm is an active management mechanism for congestion avoidance. A Weighted RED (WRED) algorithm offers the same features as RED but it selectively drops packets according to classes of service. RED and WRED, as well as other congestion control techniques, are described in "Cisco IOS Quality of Service Solutions Configuration Guide (Updated: Jan. 30, 2014)," Release 12.2, Part 3.

SUMMARY OF THE INVENTION

An embodiment of the present invention that is described herein provides a network element including multiple ports and logic. The multiple ports are configured to serve as ingress ports and egress ports for receiving and transmitting packets from and to a network. The logic is configured to queue the packets received from the ingress ports, to run a packet-dropping process that randomly drops one or more of the queued packets to avoid congestion, while detecting and excluding from the packet-dropping process, at least probabilistically, packets belonging to a predefined packet type, and to forward the queued packets that were not dropped to the egress ports.

In an embodiment, the logic is configured to prevent the packet-dropping process from dropping the packets belonging to the predefined packet type. In another embodiment, the logic is configured to assign, to the packets belonging to the predefined packet type, packet-drop probabilities that are lower than the packet-drop probabilities assigned by the packet-dropping process.

In yet another embodiment the packet-dropping process includes a Weighted Random Early Detection (WRED) process. In an embodiment, the logic is configured to detect and exclude from the packet-dropping process, at least probabilistically, TCP-SYN packets. In some embodiments the logic is configured to detect and exclude from the packet-dropping process, at least probabilistically, TCP-FIN packets. In other embodiments the logic is configured to detect and exclude from the packet-dropping process, at least probabilistically, packets that belong to flows that do not cause congestion. In yet other embodiments the logic is configured to detect and exclude from the packet-dropping process, at least probabilistically, packets that belong to flows having less than a predefined number of packets.

There is additionally provided, in accordance with an embodiment of the present invention, a method including, in a network element, receiving and transmitting packets from and to a network using multiple ports that serve as ingress and egress ports. Packets received from the ingress ports are queued. A packet-dropping process, which randomly drops one or more of the queued packets to avoid congestion, is run, while detecting and excluding from the packet-dropping process, at least probabilistically, packets belonging to a predefined packet type. The queued packets, which were not dropped, are forwarded to the egress ports.

The present invention will be more fully understood from the following detailed description of the embodiments thereof, taken together with the drawings in which:

DETAILED DESCRIPTION OF EMBODIMENTS

Overview

Figure 1:
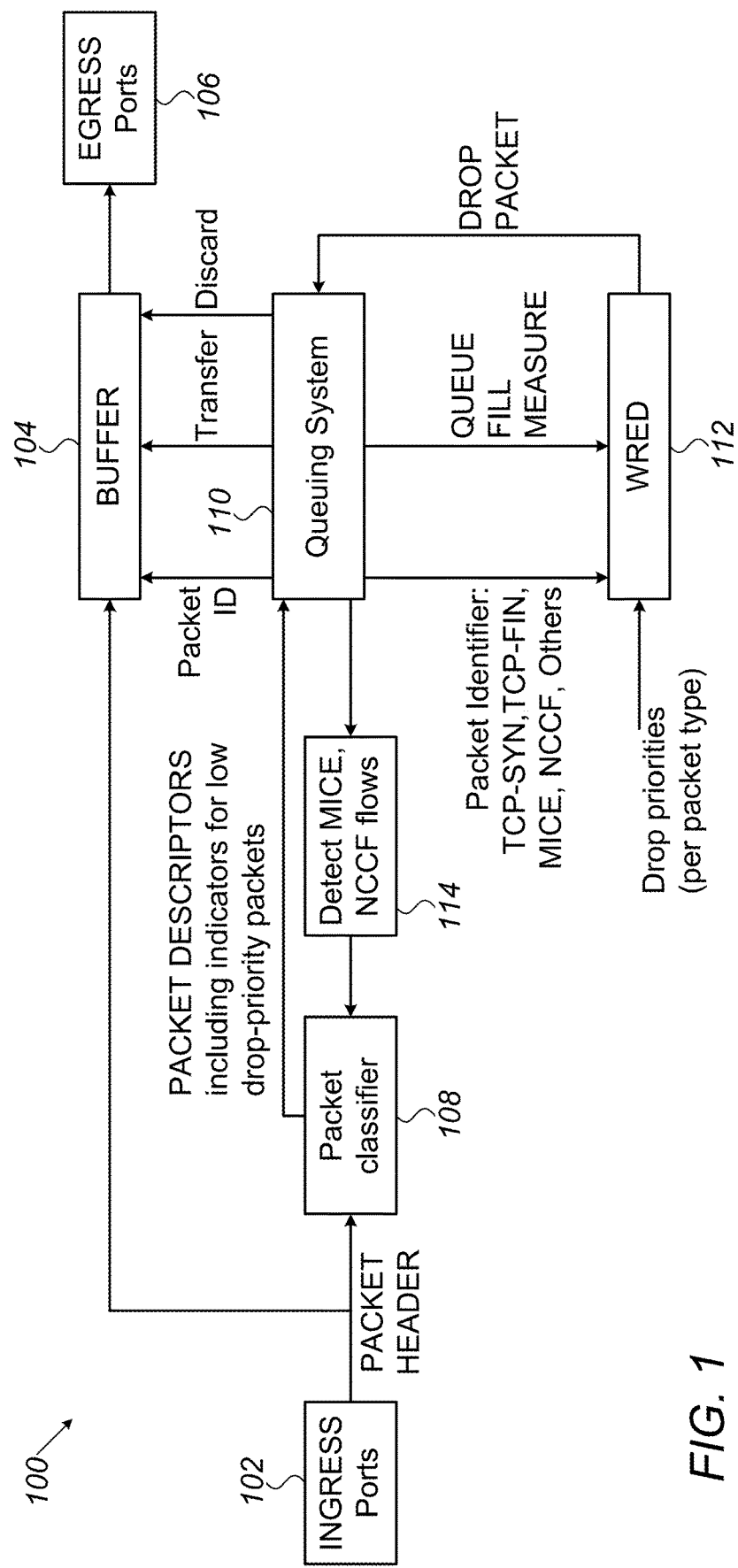
FIG. 1 is a block diagram that schematically illustrates the architecture of a communication network element with WRED protection, in accordance with an embodiment of the present invention.

The Random Early Detection (RED) algorithm, wherein, based on the queue threshold, random packets are discarded, is widely used for congestion avoidance in the Internet and other packet switched networks. RFC2309 (B. Braden et al., "Recommendations on Queue Management and Congestion Avoidance in the Internet," April 1998) states that RED should be used as the default mechanism for managing queues in routers unless there are good reasons to use another mechanism. Weighted Random Early Detection (WRED) algorithm is an extension to RED, wherein a single queue may have several queue thresholds, each associated with a traffic class; thus, flows may be differentiated in terms of QOS.

In embodiments of the present invention, a network element may comprise logic that classifies packets that the network element receives, and marks some of the packets as low drop-priority packets. The network element will then refrain from dropping such low drop-priority packets, when possible. An example of low drop-priority packets is packets that, if dropped, result in long time-out periods (i.e., periods when the transmitter waits for an acknowledgement that never arrives) and severely lower the Quality of Service (QOS). In another example of low drop-priority packets, some flows are sparse, and typically do not cause congestion; dropping packets from those flows, therefore, is less likely to lower the system congestion than the dropping of other packets.

In embodiments, logic in the network element classifies packets and detects low drop-priority packets such as TCP-SYN packet (and its ACK packet); and/or TCP-FIN packet (and its ACK packet). TCP-SYN and TCP-FIN are used to start and end (respectively) a TCP connection. If dropped, the sender must wait for timeout and then send another TCP-SYN or TCP-FIN. TCP-SYN, TCP-FIN and their ACK packets are, therefore, typically considered low drop-priority packets.

In embodiments of the present invention, flows with fewer than C packets are referred to as "MICE", whereas flows with at least C packets are referred to as "ELEPHANTS". The constant C is a degree of freedom, chosen depending on the target application.

In some embodiments, logic in the network element detects flows of packets which comprise low drop-priority packets. Such flows comprise, for example, "MICE" flows, which comprise packets that are typically small and infrequent, and rarely cause congestion. In embodiment, the logic may detect other types of non-congestion-causing flows (NCCFs). Some example of NCCFs are requests made by a client to a server, telemetry data sent from a server to an analyzer/orchestrator, telemetry data sent by a network switch/router to an analyzer/orchestrator, and remote control sessions.

In an embodiment, low-drop priority packets will not be dropped by the WRED mechanism. In alternative embodiments low-drop priority packets will be dropped by the WRED, but with lower probability than normal drop-priority packets (i.e. packets which are not of any low drop-priority type). In yet other embodiments, when there is more than one type of low-drop priority packets, the WRED will drop packets according to drop probabilities that the network element assigns separately for each type of packet. In some embodiments, the drop probability increases when the queue fills up, as indicated by a queue-fill measure that a queuing system generates.

In some embodiments of the present invention, the assignment of different drop priorities to packet types is a configurable feature, that can be turned on or off by a user.

System Description

FIG. 1 is a block diagram that schematically describes the architecture of a communication network element 100 with WRED congestion-protection, in accordance with an embodiment of the present invention. Network element 100 comprises Ingress Ports 102, which are configured to receive packets from the network (not shown); a Buffer 104, which is configured to temporarily store packets that the buffer receives from the Ingress Ports; Egress Ports 106, which are configured to receive packets from Buffer 104 and to transmit the packets over the network; a Queuing System 110, which is configured to control the transfer of packets that the Buffer stores to the Egress ports; and, a Weighted-Random-Early-Drop (WRED) 112, which is configured to indicate to the queuing system that packets should be dropped.

In the example embodiment of FIG. 1, buffer 104 is further configured to receive from the queuing system, for each packet that the buffer stores, an indication comprising a Discard control, a Transfer control and a Packet ID; and to discard or transfer the packets (to the Egress ports), accordingly. Either Transfer or Discard (or none) may be signaled at the same time, indicating that the buffer should transfer or drop packets with ID corresponding to the ID indication.

WRED 112 is configured to receive from Queuing System 110 a Queue-Fill-Measure, and to randomly indicate to the Queuing System that packets should be dropped. The Queuing System is configured to keep track of the packets that the buffer stores, to receive drop indication from WRED 112, and to control the buffer to transfer or drop packets.

According to the example embodiment of FIG. 1, Network element 100 further comprises a Packet Classifier 108, and a MICE/NCCF detection unit 114. Packet Classifier 108 is configured to receive packet headers from Ingress Ports 102, and to send Packets Descriptors to Queuing System 110. MICE/NFFC Detection Logic 114 is configured to detect MICE flow and other NCCFs, and to indicate the header structure of MICE/NFFC packets to Packet Classifier 108. The packet classifier is further configured to detect low drop-priority packets, and to send packet descriptors to the queuing system, comprising indications of TCP-SYN, TCP-SYN-ACK, TCP-FIN, TCP-FIN-ACK, MICE packets, other NCCF packets, and normal drop-priority packets.

Queuing system 110 is further configured to send to the WRED identifiers of low-drop-priority and normal drop-priority packets. According to the example embodiment of FIG. 1, the low drop-priority packet types may have different drop probabilities—for example, the network element may set the drop probabilities of TCP-SYN/TCP-SYN-ACK, TCP-FIN/TCP-FIN-ACK, MICE packets, NCCF packets and normal drop-priority packets (for a given queue-fill measure) to 1%, 2%, 10%, 11% and 40%, respectively. In embodiments, the network element may set the probabilities to initial values. In some embodiments, the network element analyzes packets traffic, and may modify the probability values based on the traffic analysis.

In embodiments of the present invention, the assignment of different drop probabilities to different packet types is a configurable feature, which can be turned off (for example, by assigning the same probability to all packet types), or on.

WRED 112 is configured to indicate to queuing system 110 if a packet should be dropped (i.e. discarded). The WRED receives the packet type from the queuing system, and indicates that a packet should be dropped randomly, according to the drop probability set by the network element. In some embodiments, the drop probability may increase when the queue fills up; for example, if a queue-fill measure is above a preset threshold, the WRED may drop packets with higher probability.

Thus, according to the example embodiment of FIG. 1. the WRED will drop low drop-priority packets less frequently than normal drop-priority packets, and the penalty associated with dropping of packets will be decreased, increasing performance and QOS.

As would be appreciated, the configuration of network element 100 is an example configuration that is depicted purely for the sake of conceptual clarity. Other suitable configurations may be used in alternative embodiments of the present invention. For example, network element 100 may be an aggregation of switches, other (additional or alternative) types of low-drop-priority packets may be detected; there may be more than one queue, and the WRED may have different settings for packets of the various queues. In some embodiments, network element 100 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Figure 2:
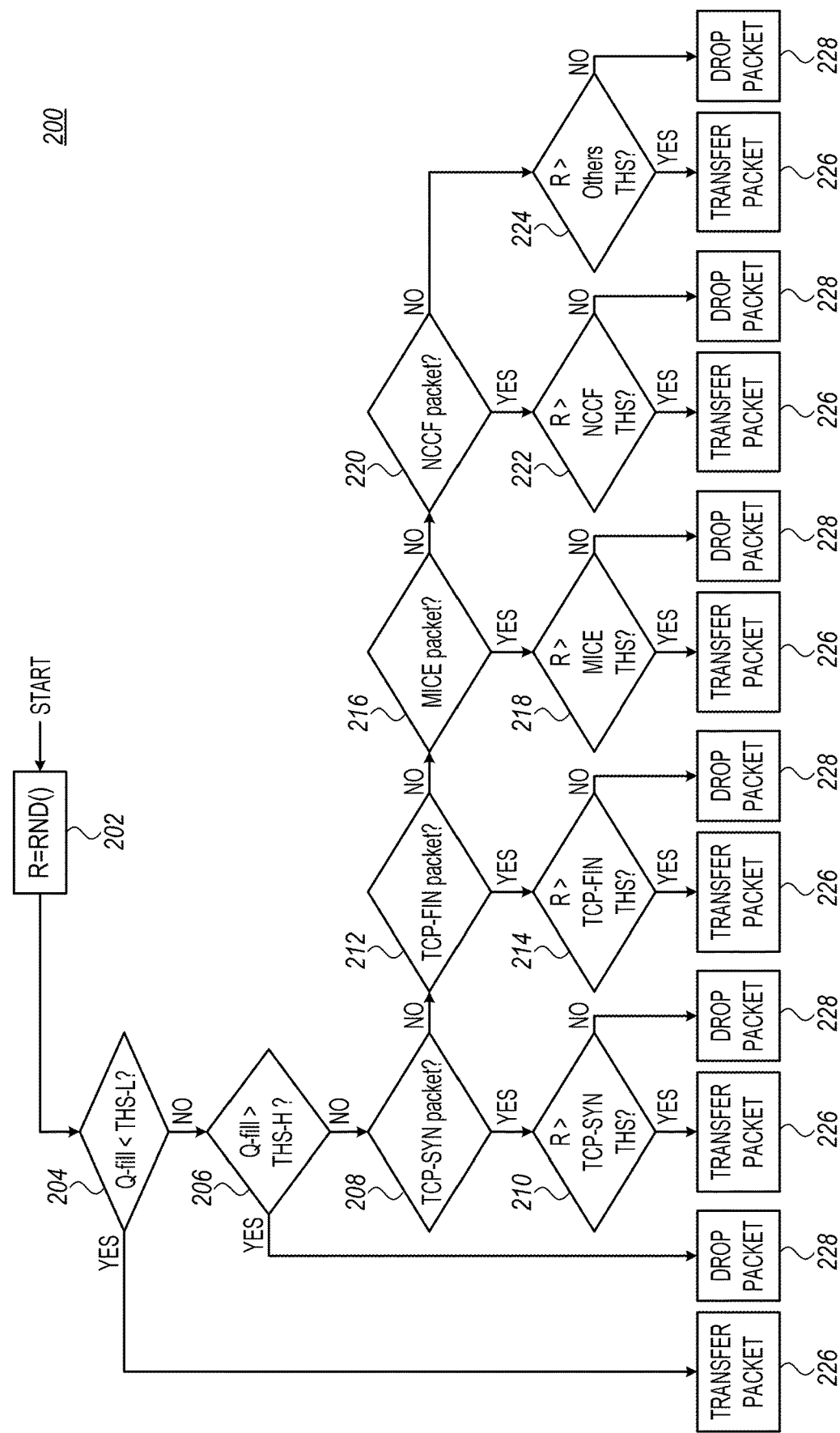
FIG. 2 is a flow chart that schematically illustrates a method for randomly dropping packets, in accordance with an embodiment of the present invention.

FIG. 2 is a flow chart 200 that schematically describes a method for randomly dropping packets, in accordance with an embodiment of the present invention. The flow is executed by WRED 112 (FIG. 1), for each packet separately.

The flow starts at a Selecting-Random-Number step 202, wherein the WRED selects a random number, for example a floating-point number between 0 and 1. Next, the WRED enters a Checking-Q-FILL-LOW step 204, wherein the WRED compares the queue-fill measure that is output from Queuing System 110 (FIG. 1), to a preset threshold THS-L. If the queue-fill measure is lower than THS-L, the WRED will next enter a Transferring-Packet step 226; whereas if the queue-fill measure is not lower than THS-L, the WRED will next enter a Checking-Q-FILL-HI step 206. In step 206 the WRED compares the queue-fill measure to a preset threshold THS-H. If the queue-fill measure is higher than THS-H, the WRED will next execute a Dropping-Packet step 228, whereas if the queue-fill measure is not higher than THS-H, the WRED will enter a Checking-TCP-SYN-Packet step 206.

At step 208 the WRED checks if the packet is a TCP-SYN/TCP-SYN-ACK (as indicated by the Packet Identifier output of Queuing System 110). After step 208 the WRED enters a Comparing-TCP-SYN Threshold step 210 if the packet is TCP-SYN or TCP-SYN-ACK, or a Checking-TCP-FIN-Packet step 212 otherwise.

In a similar manner, at step 212 the WRED checks if the packets is TCP-FIN/TCP-FIN-ACK, and enters a Comparing TCP-FIN Threshold step 214 if it is, and a Checking-MICE step 216 otherwise; at step 216 the WRED checks if the packet is part of a MICE flow, and enters a Comparing MICE Threshold step 218 if it is, and a Checking-NCCF step 220 otherwise; and, at step 220 the WRED checks if the packet is part of an NCCF flow, and enters a Comparing NCCF Threshold step 222 if it is, and a Checking-Others-Threshold step 224 otherwise.

At steps 210, 214, 218, 222 and 224, the WRED checks if the random number is greater than the threshold THS set for the corresponding packet type. If the random number is greater than the threshold, the WRED enters Transferring-Packet step 226, wherein the WRED does not indicate to the queuing system that the packet should be dropped; whereas if the random number is not greater than the threshold, the WRED will enter a Dropping-Packet step 228, and signal to the queuing system that the packet should be dropped.

After steps 226 and 228, the flow ends.

As would be appreciated, flow-chart 200 is an example flow-chart that is depicted purely for the sake of conceptual clarity. Other suitable flowcharts may be used in alternative embodiments of the present invention. For example, the generation of a random number of step 202 and the further comparisons to the random number (in steps 210, 214, 218, 222 and 224) may be replaced in alternative embodiments by randomizing N bits, and searching for the longest stream of '1'; by reading a pre-prepared table of "true" and "false" values, or by any other suitable scheme.

In addition, the thresholds may change with respect to the queue-fill measure and other congestion indicators; other types of low drop-priority packets may be added; and, the flow may be extended by the addition of high drop-priority packets, with a different set of thresholds. The flow may be executed by software, by hardware or by a combination thereof; the flow may be executed sequentially or concurrently, or, in a combination of sequential and concurrent execution. In some embodiments, network element 100 comprises more than one queue, and WRED 112 may have different thresholds for packets from different queues.

The configurations of network element 100, shown in FIG. 1, and flow-chart 200 shown in FIG. 2 are example configurations that are shown purely for the sake of conceptual clarity. Any other suitable configurations can be used in alternative embodiments. Network Element 100 may comprise, for example, a communication switch, a router, a server with switching capabilities or aggregation of network elements. The different elements of network element 100 may be implemented using suitable hardware, such as in one or more Application-Specific Integrated Circuits (ASICs) or Field-Programmable Gate Arrays (FPGAs), using software, using hardware, or using a combination of hardware and software elements.

In the example of FIG. 1, ingress ports 102 and egress ports 106 are shows as separate elements for clarity. Typically, the network element comprises multiple ports, each serving as ingress ports for some packets and as egress ports for other packets. The elements of network element 100 other than the ports are referred to herein collectively as "logic."

Although the embodiments described herein mainly address network elements, the methods and systems described herein can also be used in various other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple ports, configured to serve as ingress ports and egress ports for receiving and transmitting packets from and to a network;
a buffer which queues the packets received from the ingress ports;
a weighted random early detection (WRED) system which is configured to determine when a fill level of the buffer requires random packet dropping to avoid congestion, to determine first flows from which packets are to be dropped when random packet dropping is required, to drop packets which are not TCP-SYN or TCP-FIN packets from the first flows in accordance with a first dropping probability and to drop TCP-SYN packets of the first flows with a second dropping probability lower than the first dropping probability; and
a forwarding system which forwards the queued packets, which were not dropped, to the egress ports.

2. The network element according to claim 1, wherein the second dropping probability is zero.

3. The network element according to claim 1, wherein the second dropping probability is not zero.

4. The network element according to claim 1, wherein the packet-dropping is performed in accordance with a Weighted Random Early Detection (WRED) process.

5. The network element according to claim 1, wherein the WRED system is configured to drop TCP-FIN packets of the first flows when performing the random packet-dropping, with a probability lower than the first dropping probability.

6. The network element according to claim 1, wherein the WRED system is also configured to detect and exclude from the packet-dropping process, at least probabilistically, packets that belong to flows that do not cause congestion.

7. The network element according to claim 1, wherein the WRED system is also configured to detect and exclude from the packet-dropping, at least probabilistically, packets that belong to flows having less than a predefined number of packets.

8. The network element according to claim 1, wherein the network element is configured to modify the second dropping probability based on traffic analysis.

9. A method, comprising:
in a network element, receiving and transmitting packets from and to a network using multiple ports that serve as ingress and egress ports;

queuing packets received from the ingress ports in a buffer;

when a fill level of the buffer requires random packet dropping to avoid congestion, determining first flows from which packets are to be dropped and dropping packets which are not TCP-SYN or TCP-FIN packets from the first flows in accordance with a first dropping probability and dropping TCP-SYN packets of the first flows with a second dropping probability lower than the first dropping probability;

forwarding the queued packets, which were not dropped, to the egress ports.

10. The method according to claim 9, wherein second dropping probability is zero.

11. The method according to claim 9, wherein second dropping probability is not zero.

12. The method according to claim 9, wherein the packet-dropping is performed in accordance with a Weighted Random Early Detection (WRED) process.

13. The method according to claim 9, further comprising dropping TCP-FIN packets of the first flows when performing the random packet-dropping, with a probability lower than the first dropping probability.

14. The method according to claim 9, wherein determining first flows from which packets are to be dropped comprises detecting and excluding from the packet-dropping packets that belong to flows that do not cause congestion.

15. The method according to claim 9, wherein determining first flows from which packets are to be dropped comprises detecting and excluding from the packet-dropping process packets that belong to flows having less than a predefined number of packets.

* * * * *